United States Patent Office 3,845,190
Patented Oct. 29, 1974

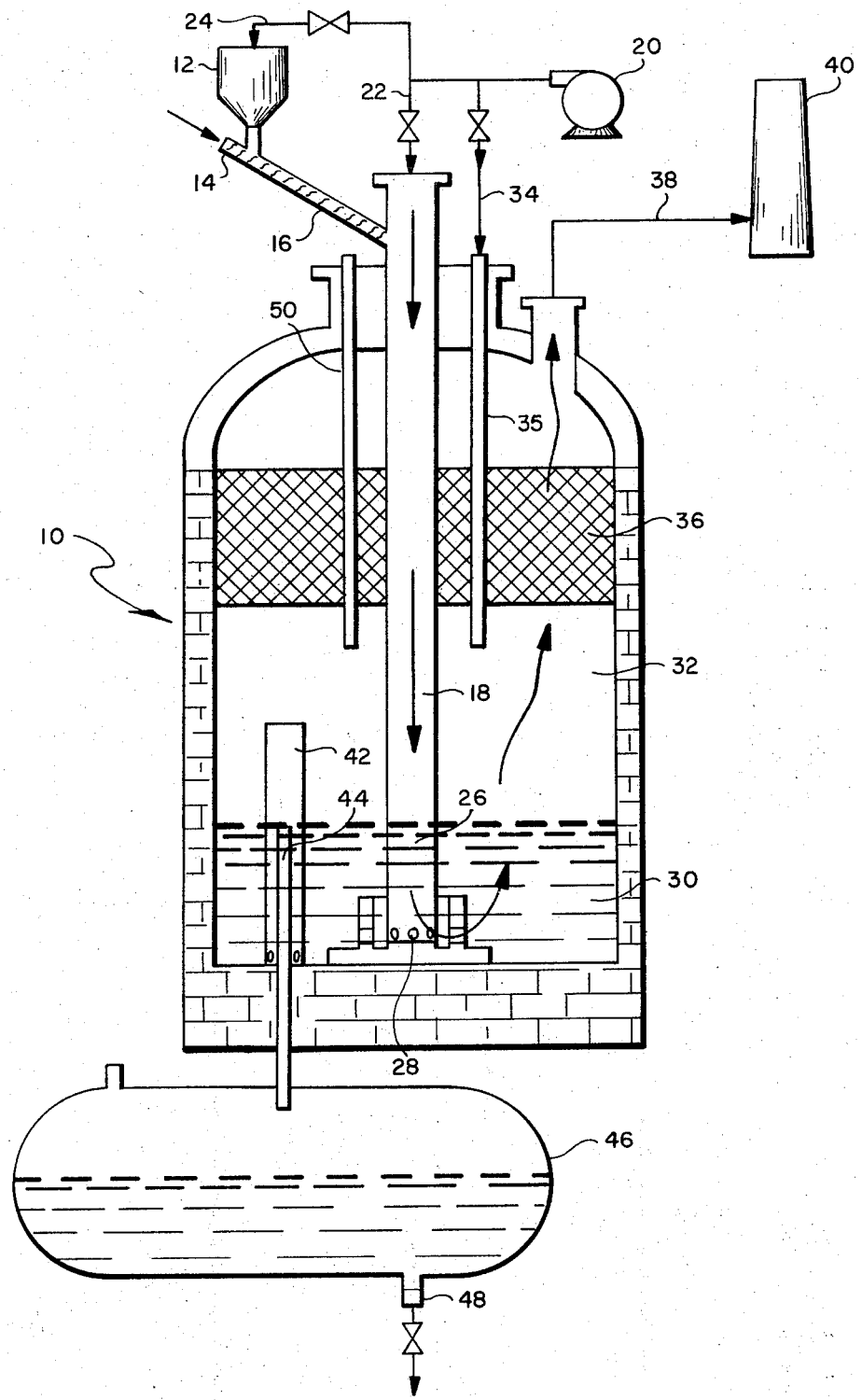

3,845,190
DISPOSAL OF ORGANIC PESTICIDES
Samuel J. Yosim and Donald E. McKenzie, Woodland Hills, and Le Roy E. Grantham, Calabasas, Calif., and James R. Birk, Hinsdale, Ill., assignors to Rockwell International Corporation, El Segundo, Calif.
Continuation-in-part of abandoned application Ser. No. 264,646, June 20, 1972. This application May 16, 1973, Ser. No. 360,997
Int. Cl. B01j 1/00
U.S. Cl. 423—184       8 Claims

ABSTRACT OF THE DISCLOSURE

A waste-control process is used for the ultimate disposal of organic pesticides with negligible environmental pollution by feeding the pesticide and a source of oxygen into a molten salt containing an alkali metal carbonate and preferably also an alkali metal sulfate to pyrolytically decompose and at least partially oxidize the pesticide. Some of the resulting decomposition products react with and are retained in the melt; remaining gaseous products pass through the melt to the atmosphere or are conducted to a second reaction zone where oxidation of any combustible matter present is completed. Certain organic pesticides may be completely combusted in the first reaction zone by using an excess of oxygen or air in this zone during the decomposition reaction. Thereby the final gases vented to the atmosphere as a result of oxidative treatment in only the first zone or in both zones include only such gases as carbon dioxide, water vapor, oxygen and nitrogen.

CROSS REFERENCES TO RELATED APPLICATIONS

This application is a continuation-in-part of application Ser. No. 264,646 filed June 20, 1972 and since abandoned.

BACKGROUND OF THE INVENTION

This invention relates to a waste-control process for the disposal of pesticides. It particularly relates to a molten salt process for the ultimate disposal of organic pesticides with negligible environmental pollution.

Pesticides, or economic poisons, are defined as chemicals intended for the control, suppression, or destruction of plants or animals which are of economic significance because of their being detrimental to man or his interests. Thus the total worldwide damage caused by agricultural pests alone has been estimated as approaching $100 billion annually.

Pesticides are classified according to the target organism they control. The major classes of particular economic significance are the herbicides, insecticides, fungicides, and nematicides. Several of the organic herbicides and insecticides are produced annually in amounts of hundreds of tons. A frequent need arises for a safe, non-polluting manner for disposing of excess amounts of these pesticides, either in large-scale quantities or as residual amounts present in used containers. With the continuing and increasing use of many varied pesticides for selected purposes and in greater quantities, the essentially complete disposal of those pesticides, alone or together with their containers, in a rapid, simple and convenient manner become an increasingly important and complex evironmental problem.

While several waste-disposal methods have been proposed, these methods have presented various drawbacks with respect to cost, lack of general applicability, or the creation of other problems by their use. Thus the disposal of pesticides by conventional landfill techniques is not ordinarily suitable because many of the pesticides are relatively persistent and nonbiodegradable and are also to some extent leached from the soil by water. Also, their presence in the soil may present additional problems from an agronomic and environmental standpoint. Of particular concern in this regard are the chlorinated hydrocarbon insecticides and the urea, triazine, picloram, and phenoxy acetic acid type herbicides. Conventional incineration in stationary kilns has the drawback that often highly toxic gases, e.g., phosgene, are released, or the ash residue is highly toxic. Chemical degradation techniques are often limited to specific classes of pesticides as well as being generally too costly.

SUMMARY OF THE INVENTION

It is an object of the present invention to provide a simple, rapid, and nontoxic waste-control process for the ultimate disposal of organic pesticides with negligible environmental pollution.

It is a further object to provide such a method suitable for the disposal of pesticide containers.

In accordance with the broad aspects of the present invention, the pesticide and a source of oxygen, suitably and preferably air, are fed into a reaction zone characterized as a pool of a molten salt mixture maintained at a temperature between 400 and 1500° C., preferably between 700 and 1000° C., and consisting essentially either only of an alkali metal carbonate or mixture of alkali metal carbonates, or preferably consisting essentially of a major portion (more than 50 wt. percent) of an alkali metal carbonate and a minor portion of at least 1 wt. percent of an alkali metal sulfate. The organic pesticide is decomposed, by partial or substantially complete combustion, to form decomposition and combustion products, including a gaseous effluent. Where excess air is passed into the melt during the thermal treatment of certain organic pesticides, substantially complete combustion of the organic pesticide is obtainable in the melt. The evolved gases from this first treatment zone then include only the formed carbon dioxide and water vapor, and also oxygen and nitrogen from the air. However, where combustible matter is present in the gaseous effluent, it is preferred that the gaseous effluent be further treated in a secondary combustion zone. This is readily accomplished by passing the gaseous effluent into a second reaction zone where combustible gases or any combustible matter present in these gases is further oxidized. Thereby the gaseous effluent vented to the atmosphere from either the first reacting zone or either the first and second reaction zones consists essentially only of gases selected from carbon dioxide, water vapor, oxygen and nitrogen. Other decomposition or oxidation products of the pesticide are retained in the melt. Essentially total destruction of the pesticide thus occurs.

Where containers of plastic, paper, glass or metal having adherent pesticide residues are to be disposed of, it is preferred to use a molten salt mixture consisting essentially of the $Na_2CO_3$-$K_2CO_3$ eutectic (m.p. 710° C.) and containing from about 1 to 25 wt. percent sodium sulfate. The process may conveniently be practiced for the disposal of such pesticide-containing containers by combusting the containers in such a melt at a temperature between 700 and 1000° C. in a portable disposal unit mounted on a truck bed.

Where relatively large quantities of pesticides are to be disposed of, or higher temperatures to insure total disposal are required, it is preferred to maintain the molten salt mixture at a temperature between 850 and 1000° C., particularly between 900 and 950° C. Such a molten salt mixture preferably consists essentially of sodium carbonate containing from about 1 to 25 wt. percent sodium sulfate. An amount between 5 and 15 wt. percent sodium sulfate is particularly preferred. Where only partial combustion of organic matter takes place in the first reaction zone, then in order to complete oxidation of this combustible matter, which may include carbonanceous particulate matter as well as gases that are further oxidizable, it is fed to the second reaction zone. A second source of oxygen, preferably air, is also fed into the second reaction zone. For certain applications a metal mesh, e.g., stainless steel, or a ceramic-coated metal mesh, e.g., aluminized or alumina-coated stainless steel, is added to this second zone to serve as a source of ignition and also to demist the gaseous effluent of any particles of the molten salt mixture present in it prior to venting this effluent to the atmosphere.

Depending upon the decomposition products of the pesticide that are retained in the melt, it is preferable and frequently required that the melt be further treated so as to be nontoxic and noncontaminating when ultimately disposed of in a body of water or in the soil. The melt containing the retained decomposition products is treated with air to oxidize any residual sulfide to sulfate. It is then cooled for disposal in a dry lake bed or treated with water and lime for disposal in an approved dump site. Where the melt essentially contains only chlorides, such as sodium chloride resulting from the decomposition of chlorinated hydrocarbon pesticides, the entire residue may be directly disposed of into a large body of water such as the ocean.

A wide variety of organic pesticides may be rapidly and conveniently treated by the present process with relatively minor modification in treatment techniques because the process basically involves destruction of the organic compound whether the initial step is partial or complete combustion. The process is particularly suitable for disposal of those organic insecticides and herbicides of large-scale manufacture and which require frequent and convenient disposal. Thus particularly suitable for treatment by the present process are the chlorinated hydrocarbon insecticides such as chlordane, DDT, dieldrin, heptachlor, and aldrin; the phenoxy acetic acid, toluidine, and nitrile herbicides, illustratively, trifluralin, 2,4-D, 2,4,5-T, dichlobenil, and MCPA; and the phosphorus-containing insecticides such as diazinon, disulfoton, phorate, Malathion, and parathion. These compounds are rapidly destroyed at the decomposition temperatures used, and the resulting acidic products and gases are absorbed and neutralized by the molten alkali metal carbonate. Any toxic gases and carbonaceous particulate matter evolved are passed through the melt and completely combusted therein or are further oxidized in the second reaction zone.

While it is not intended to limit the practice of the present invention by the preferred explanation, it is believed that the present molten salt process for the destruction of pesticides, particularly in its preferred aspects utilizing an alkali carbonate melt containing alkali metal sulfate, is effective in the following manner. Illustratively, when a pesticide is reacted at a preferred temperature between 850 and 1000° C. with a sodium carbonate melt containing from about 1 to 25 wt. percent sodium sulfate, several reactions occur. The initial reaction where only a limited supply of air is used is that of pyrolysis and partial oxidation by the sulfate to form char, water vapor, combustible gases such as hydrocarbons and carbon monoxide, and acidic gases. The acidic gases are instantly neutralized by the alkaline salt. The combustible gases plus any unreacted carbonaceous particulates are consumed in the second reaction zone. The char remains in the sulfate melt in the first zone until completely consumed by reactions with the sulfate. In the above reaction sequence, the reaction of char with the sodium sulfate to form sodium sulfide is an endothermic one. The sodium sulfate is simultaneously regenerated in an exothermic reaction by reacting a source of oxygen such as air with the dissolved sodium sulfide. The following exemplary reactions take place:

$$Na_2SO_4 + 2C \rightarrow Na_2S + 2CO_2 \text{ (endothermic)}$$

$$Na_2S + 2O_2 \rightarrow Na_2SO_4 \text{ (exothermic)}$$

where C represents the carbonaceous portion of the pesticide, or the char. That an exothermic reaction occurs when sulfide is converted to sulfate is known. Such a reaction is utilized for example in U.S. Pat. 3,567,412 where a portion of a carbonaceous material is combusted so as to provide heat for a gasification reaction by using an oxidizing agent in the presence of sulfate. This reaction is also essentially utilized in U.S. Pat. 3,708,270 in a method of pyrolyzing carbonaceous materials and in U.S. Pat. 3,710,737 in a method of generating heat and consuming carbonaceous materials.

While the net overall reaction that occurs is the oxidation of the char, the combination of the oxygen and carbon occurs indirectly in that each component reacts separately with a component present in the molten salt, as above shown. While the sodium carbonate essentially does not take part in the chemical reactions shown, it provides a compatible salt medium at practical operating temperatures and, in addition, provides heat for initiating pyrolysis and combustion as well as reacting with acidic pollutants. Thus it uniquely provides a highly effective non-contaminating, stable thermal decomposition medium, particularly where excess air is fed to the system. In the presence of excess air, i.e., containing sufficient oxygen for complete combustion of all organic matter present, the molten salt medium appears to promote direct reaction in the melt of the organic thermal decomposition products with the oxygen so that complete combustion occurs rapidly within the melt. Thus in the present process, the ultimate gaseous products evolved are $H_2O$ and $CO_2$. $N_2$ is also evolved where the source of oxygen used is air. Unreacted oxygen is also present.

Where chlorinated hydrocarbons constitute the pesticides being treated, sodium chloride is formed in the melt. In the case of organic phosphate compounds, sodium phosphates are formed. Where sulfur is present in the material, sodium sulfate will be produced. All of these formed inorganic compounds are retained in the melt.

When the capability limit of the salt to react with pesticides has been reached, the salt is removed and fresh make-up salt is added. The spent salt is recovered or otherwise disposed of.

BRIEF DESCRIPTION OF THE DRAWING

The sole figure of the drawing shows a schematic illustration of a preferred embodiment of apparatus for practicing the process of this invention.

DESCRIPTION OF THE PREFERRED
EMBODIMENTS

In the broadest aspects of the present invention, an organic pesticide is decomposed by a molten salt containing either only an alkali metal carbonate or, preferably, also containing an alkali metal sulfate, some of the decomposition products being retained in the molten salt while others are further oxidized to $CO_2$ and $H_2O$ either in the salt or in a secondary combuster separate from the salt. Where it is desired to perform the decomposition of the pesticide at a relatively low temperature, a low-melting binary or ternary mixture of alkali metal carbonates may be utilized. Thus the ternary alkali metal carbonate eutectic melts at 397±1° C. and consists of 43.5, 31.5, and 25.0 mole percent of the carbonates of lithium, sodium, and potassium, respectively. A preferred binary mixture is the $Na_2CO_3$-$K_2CO_3$ eutectic which melts at 710° C. While the alkali metal sulfate utilized may consist of any of the sulfates of the foregoing alkali metals, in general sodium sulfate is preferred because of its ready availability and low cost.

Because of the importance of having a convenient, rapid, safe and effective method of economic interest for complete disposal of unwanted pesticides, the present invention will be particularly described with reference to such a preferred process utilizing a molten salt consisting essentially of sodium carbonate containing from 1 to 25 wt. percent sodium sulfate at a temperature between 850 and 1000° C., preferably between 900 and 950° C., and further utilizing a plurality of zones for effecting complete combustion and ultimate disposal of the organic pesticide.

Referring to the drawing, a refractory-lined pesticide disposal furnace 10 is shown. An organic pesticide as a free-flowing powder or an adherent component of a pulverized packaging or container material is contained in a feed hopper 12 attached to an auger-type screw conveyor 14 and is fed by way of a conduit 16 to a first zone 18 of furnace 10. Alternatively, liquid pesticides or pesticides dissolved or dispersed in a liquid medium may be directly sprayed into zone 18. Alumina is a suitable material of construction for this zone. At the same time a stream of air from a blower 20 is fed by way of a valved conduit 22 to zone 18. Air is also fed by way of a valved conduit 24 to hopper 12 so as to prevent any back pressure through conduit 16 due to evolved gases formed during the thermal decomposition or combustion reaction. The pesticide and the air stream impinge upon a pool 26 of molten salt disposed in the bottom of zone 18. Preferably this molten salt pool consists of molten sodium carbonate containing from 1 to 25 wt. percent sodium sulfate. The thermal decomposition reaction is effectively and preferably accomplished in this pool at a temperature between 900 and 950° C. at which the salt is molten. Because of the exothermic reaction occurring when the char-containing salt is contacted with air, sufficient heat is internally generated to maintain the salt in the molten state. At the same time, partial or complete oxidation of the organic pesticide present occurs, depending on the nature of the pesticide and the amount of air fed with the pesticide to zone 18. The carbonaceous products formed and the gases evolved because of the decomposition reaction bubble through the molten salt, acidic gases formed such as sulfur dioxide and hydrogen chloride being immediately neutralized. Most of the carbonaceous material formed is consumed in molten salt pools 26 and 30, which freely intermix, by reaction with the sodium sulfate therein to form carbon dioxide and sodium sulfide. The effluent gases, which also generally contain carbonaceous particulate matter, bubble through openings 28 at the bottom of zone 18 into pool 30 of molten salt which also constitutes part of zone 18 because of the intermixing of these pools. Completion of combustion of combustible gases evolved from pool 30 takes place in a second reaction zone 32. A stream of air is fed by way of a valved conduit 34 to a tube 35 communicating with second reaction zone 32. For some applications tube 35 may be extended below the surface of the melt in pool 30 to cool the molten salt and at the same time preheat the air so that more rapid combustion occurs in zone 32. A corrosion-resistant wire mesh 36, suitably an aluminized or alumina-coated stainless steel mesh, is contained within reaction zone 32 and serves to ignite and promote combustion of oxidizable gases and at the same time demist any molten salt particles carried to this point from the gas stream. The effluent gases are removed from furnace 10 by way of a conduit 38 and evolved to the atmosphere by a stack 40. The evolved gases consist essentially of carbon dioxide and water vapor, formed by combustion, and oxygen and nitrogen present from the air.

The present process may be operated as a batch, semi-continuous or a continuous operation. In furnace 10, means have been provided suitable for continuous operation. An overflow chamber 42 is provided with a level regulator tube 44 so that as the liquid level is increased because of the presence of added pesticide and the reaction products formed, excess molten salt will be drained from the overflow chamber 42 by way of level regulator tube 44 into a soil pit (not shown) where it is solidified. The salt is then removed by a scoop conveyor for further disposal. Alternatively, the spent molten salt is treated with air to oxidize any residual sulfide to sulfate, and then the molten salt is drained into a body of water contained in a receiving vessel 46. The spent salt solution in vessel 46 is then drained by way of a valved exit tube 48 for further processing and ultimate disposal. Also, in order to maintain the process in a continuous manner, additional sodium carbonate and sodium sulfate is conveniently added by way of hopper 12 in admixture with added pesticide. Alternatively, additional salt is added to the molten pool in zone 18 by way of a tubular conduit 50.

The following examples illustrate the practice of the invention but are not intended to unduly limit its generally broad scope.

EXAMPLE 1

A representative pesticide used for evaluation consisted of 50% chlordane $C_{10}H_6Cl_8$, equivalent to 30% octachloro-4,7-methanotetrahydroindane and 20% related compounds. The tests were carried out in such a manner that most of the pesticide was reacted while it was in submerged contact in the melt. An upright mullite tube which was about one-half to two-thirds full of a molten mixture of sodium carbonate (ca. 85%) and sodium sulfate (ca. 15%) at a temperature of about 980° C. was contained in an electric furnace. Downstream from the mullite reactor tube were located a glass wool trap for particulate carbonaceous material, a port for taking gas chromatograph samples, an analyzer for carbon monoxide and hydrocarbons, a water scrubber and a flow meter. Small quantities consisting of a few tenths of a gram of 50% chlordane were intermittently added as a powder directly into a stainless steel air inlet tube of the mullite reactor. An air flow through the air inlet tube forced the pesticide and its pyrolysis products through about one foot of molten salt in order to permit better contact between the melt and the pesticide.

Monitoring of the gas evolution, followed by analysis of the water scrubber and of the small amount of soot evolved for chlorides and of the gas phase for hydrocarbons showed that virtually all of the solid pesticide, in excess of 99.9%, was rapidly decomposed. The exist gases contained products of the reaction between the carbonaceous material and sulfate, i.e., carbon dioxide and carbon monoxide. By increasing the ratio of air to pesticide, the presence of carbon monoxide in the evolved gases was markedly decreased. The hydrocarbon content of the gas phase was below 10 p.p.m. Even when the air to pesticide ratio was relatively low permitting a CO concentration in the gas phase of about 1 vol. percent, the hydrocarbon content in the gas phase was only 100 to 150 p.p.m. These low hydrocarbon levels indicate that the maximum amounts of chlorinated hydrocarbons in the gas are quite small. No chlorides were detected in the water scrubber when silver nitrate was added.

The melt was also analyzed for total chlorine. The results showed that amounts substantially in excess of 80 wt. percent were retained by the melt.

EXAMPLE 2

In a second type of apparatus designed for continuous disposal of larger quantities of pesticide, the molten salt consisted of 10 pounds of 80 wt. percent sodium carbonate and 20 wt. percent sodium sulfate contained in a 6-inch ID by a 30-inch long alumina tube closed at one end. The alumina tube was placed in a vertical position in a 9-inch ID by 30-inch long tube furnace into whch was inserted a closed-end thick-walled 7-inch ID by 30-inch long stainless steel vessel flanged at the top. Polyethylene packets containing 5- and 10-gram amounts of the pesticide chlordane were repeatedly added to an airstream which was bubbled through the melt through a concentric 1½-inch ID by a 48-inch long alumina tube, open at both ends, which extended 6 inches below the melt level.

All gases evolved due to pyrolysis of the pesticide in the addition tube were bubbled through about 5½ inches of molten salt where the noxious gases were chemically absorbed. Air used to oxidize the sulfide to sulfate was added through an auxiliary tube. Mixing of the smaller amount of molten salt within the addition tube and the main body of salt in the wider alumina tube was obtained by agitation of gases escaping from the melt.

It was found that substantially complete reaction of 10-gram quantities of chlordane took less than two minutes, indicating that reaction of one pound per hour is readily attainable in the described apparatus. A secondary combustion chamber was used to insure complete combustion of evolved gases. It was found that most of the particulates were removed by the melt. None were visually observed in the exit gas downstream of the secondary combustion chamber.

EXAMPLE 3

Using the same apparatus as employed in Example 2, a melt consisting of 90 wt. percent sodium carbonate and 10 wt. percent sodium sulfate was maintained in the molten state at an initial temperature between 950 and 1000° C. No attempt was made to maintain the temperaure of the melt constant during the actual course of the reaction.

Malathion, a representative organophosphorus-type pesticide which also contains organic sulfur, was placed in polyethelene bags and periodically dropped into the melt by way of an additional port. The port was closed so that all emission passed through the salt, through a secondary combuster where heated air was drawn into the system, through a glass-wool particulate trap, through the water scrubbers, and out of the system. Benzene extracts of the particulates in the glass wool and water scrubbers were evaporated to dryness and the residue analyzed. During the course of the tests, carbon monoxide and hydrocarbon emissions were determined using infrared detectors.

Ten 5-gm. packets of Malathion were added at three-minute intervals. By monitoring the carbon monoxide and hydrocarbon emission, it was determined that 5 gm. of the sample was destroyed within about 30 seconds. The secondary combustion unit consisted of a heated air feed and a hot mesh over which the gaseous emission was contacted. No carbon monoxide or hydrocarbons were detected downstream of the secondary combustion. The Malathion samples contained 2.42 gm. sulfur and 1.21 gm. phosphorus. Analysis of the benzene extracts of the resulting emissions showed only 1.2 mg. S and 1.8 mg. P, indicating that at least 99.9% of the pesticide was destroyed. Analysis of the melt after the test showed a phosphorus content of 80±15%.

EXAMPLE 4

Using the procedure and apparatus of Example 3, the representative herbicide Weed B Gon was used. This consists of 17.8 wt. percent of the isooctylester of 2,4–D and 8.4 wt. percent of the isooctylester of silver in a solution of kerosene. Six 5-gm. polyethylene-bagged packets of the herbicide were added to the system, the emitted particulates were extracted with benzene, and the benzene residue was analyzed for chlorine. Of the 1.48 gm. chlorine added, only 0.77 mg. was found in the total emissions. This indicated a pesticide destruction of at least 99.96%. Analysis of the melt before and after reaction indicated that the chlorine content of the melt (as chloride) had increased sufficiently to account for virtually all the chlorine in the pesticide added.

EXAMPLE 5

Using the procedure and apparatus of Example 3, Sevin, a typical carbamate pesticide identified as carbonyl (1 naphthyl N-menthyl) carbamate, which contains 7 wt. percent nitrogen, was evaluated. Five 5-gm. polyethylene-bagged packets of the pesticide were added to the molten salt. Of the 0.875 gm. nitrogen added, less than 0.075 mg. was found in the benzene extract. This indicated that more than 99.99% of the pesticide had been destroyed. As expected, no nitrogen was found in the melt because of the very rapid carbon-nitrate-nitrite reduction reaction occurring in these melts at these temperatures. Excessive nitric oxide emissions were not observed in the tests, peak emissions showing only about 20 p.p.m.

EXAMPLE 6

Liquid chlordane pesticide (72 percent emulsifiable concentrate) was completely combusted in a continuous feed system using excess air. The molten salt consisted of a mixture of 90 wt. percent sodium carbonate and 10 wt. percent sodium sulfate. This molten salt mixture was contained in an alumina tube placed in a stainless steel retainer vessel. The liquid chlordane pesticide was pumped into the system at a feed rate of about 1.6 lb./hr. The air and pesticide were injected into the molten salt reactor by way of an alumina feed tube. The air feed rate was about 4 std. cu. ft./min. The run was carried out for a total time of 75 minutes, the feed rate being adjusted during the first 20 minutes. A steady-state condition was achieved during the last hour of the run with about 75% excess air. The exit gas had a superficial linear velocity of about 1.6 ft./sec. The temperature of the melt was maintained at about 1000° C. Besides providing the excess oxygen for the combustion, the injected air provided cooling of the melt so as to maintain its temperature below 1050° C. The total pesticide consumption was about 2 lbs.

A particular filter and a water scrubber were used to trap any evolved organic chlorides. No organic chlorides were detected in either fraction. The detection limits indicate that less than 0.04% of the original pesticide escaped as organic chlorides from the system. Thus greater than 99.96% of the pesticide was destroyed by molten salt combustion.

The evolved exhaust gases were analyzed for the presence of possible gaseous pollutants. Without using a secondary combuster, the $NO_x$ content of the gaseous effluent was found to be less than 70 p.p.m. The CO and unburned hydrocarbon emissions were also low (less than 0.1% and less than 25 p.p.m., respectively). Gas chromatographic analysis shouwed about 12% $CO_2$, 8% $O_2$, and 80% $N_2$, in the exhaust gas.

The present process is considered to make feasible the disposal of pesticides in a continuous manner at a rate up to 1,000 lbs. per hr. It will of course be realized that many variations in reaction conditions may be used in the practice of this invention, within the limits of the parameters set forth, depending upon the organic pesticide used, whether in liquid, solid, or solution form, whether associated with packaging material, the temperature required for complete pyrolysis, and the desired rate of feed of pesticide and of oxygen to the system. Where the pesticide is in the form of a liquid or a solution, screw conveyor 14 will generally be replaced by a continuous duty pump.

Thus while the examples illustrating this invention have been described with respect to specific concentrations, temperatures, feed rates and other reaction conditions, and what is now considered to represent its best embodiment has been illustrated and described, the invention may be otherwise practiced within the scope of the teachings set forth, as will be readily apparent to those skilled in this art. Accordingly, this invention is not to be limited by the illustrative and specific embodiments thereof, but its scope should be determined in accordance with the claims thereof.

We claim:
1. A waste-control process for the ultimate disposal of an organic pesticide resulting in negligible environmental pollution comprising:

feeding the pesticide and a source of oxygen into a pool of a molten salt consisting essentially of an alkali metal carbonate or mixture of alkali metal carbonates or a major portion of an alkali metal carbonate and a minor portion of at least 1 wt. percent of an alkali metal sulfate to thermally decompose and at least partially oxidize said pesticide to form decomposition products including a gaseous effluent, and then venting a gaseous effluent product consisting essentially only of gases selected from carbon dioxide, water vapor, oxygen and nitrogen to the atmosphere while retaining the remaining decomposition products of the pesticide in the melt.

2. The process of Claim 1 wherein said molten salt mixture is at a temperature between 400 and 1500° C.

3. The process of Claim 1 wherein said molten salt mixture is at a temperature between 850 and 1000° C. and consists essentially of sodium carbonate containing from about 1 to 25 wt. percent sodium sulfate.

4. The process of Claim 1 wherein said pesticide fed into said molten salt mixture includes associated therewith container material or liquid therefor.

5. The process of Claim 1 wherein prior to venting of said gaseous effluent to the atmosphere it is passed into a second reaction zone in the presence of a source of oxygen to complete oxidation of any combustible matter present in said effluent.

6. The process of Claim 5 wherein a metal mesh serves to demist particles of the molten salt mixture present in the gaseous effluent prior to venting of said effluent to the atmosphere.

7. The process of Claim 5 wherein said molten salt mixture is at a temperature between 700 and 1000° C. and consists essentially of sodium carbonate containing from about 1 to 25 wt. percent sodium sulfate.

8. The process of Claim 4 wherein the molten salt mixture consists essentially of the $Na_2CO_3$-$K_2CO_3$ eutectic containing from about 1 to 25 wt. percent sodium sulfate and is maintained at a temperature between 700 and 1000° C.

References Cited

UNITED STATES PATENTS

| 292,742 | 7/1943 | Beck et al. | 423—659 |
| 393,258 | 7/1943 | Beck et al. | 423—659 |

FOREIGN PATENTS

| 242,791 | 11/1960 | Australia | 423—659 |

EDWARD STERN, Primary Examiner

U.S. Cl. X.R.

423—351, 437, 499, 579, 659

UNITED STATES PATENT AND TRADEMARK OFFICE
CERTIFICATE OF CORRECTION

PATENT NO. : 3,845,190

DATED : Oct. 29, 1974

INVENTOR(S) : Samuel J. Yosim et al

It is certified that error appears in the above-identified patent and that said Letters Patent are hereby corrected as shown below:

Column 1, line 5, "LeRoy E. Grantham" should read --LeRoy F. Grantham--; line 64, "those" should read --these--; line 66, after "manner" insert --has--.

Column 8, line 35, "particular" should read --particulate--.

Column 10, under "References Cited" before the Beck et al references "292,742" and "393,258" insert --Ser. No.--.

Signed and Sealed this

Sixth Day of July 1976

[SEAL]

Attest:

RUTH C. MASON
*Attesting Officer*

C. MARSHALL DANN
*Commissioner of Patents and Trademarks*